United States Patent [19]

Baker

[11] Patent Number: 4,532,604
[45] Date of Patent: Jul. 30, 1985

[54] PREDISTORTION CIRCUIT

[75] Inventor: Jay S. Baker, San Carlos, Calif.

[73] Assignee: Ampex Corporation, Redwood City, Calif.

[21] Appl. No.: 418,904

[22] Filed: Sep. 16, 1982

[51] Int. Cl.³ ............................................. H02M 5/16
[52] U.S. Cl. ..................................... 364/851; 364/813; 364/857; 364/722; 364/753; 328/16; 328/142; 331/76
[58] Field of Search ............... 364/813, 851, 857, 715, 364/718, 722, 736, 753, 814, 841; 328/144, 142, 16; 331/76

[56] References Cited

U.S. PATENT DOCUMENTS

| | | | |
|---|---|---|---|
| 3,086,166 | 4/1963 | Salvatori | 364/813 |
| 3,840,813 | 10/1974 | Allen et al. | 328/144 |
| 3,911,291 | 10/1975 | Rossell | 328/144 |
| 4,019,118 | 4/1977 | Harwood | 328/144 |
| 4,042,815 | 8/1977 | Brown et al. | 364/841 |
| 4,347,541 | 8/1982 | Chen et al. | 361/97 |

Primary Examiner—Jerry Smith
Assistant Examiner—Allen MacDonald
Attorney, Agent, or Firm—George B. Almeida; Joel D. Talcott

[57] ABSTRACT

A predistortion error signal, corresponding to the third harmonic of an input signal, is generated by obtaining the absolute value of the input signal and multiplying it by the input signal of given sign to provide the square of the latter times the sign of the input signal. The squared signal then is multiplied by the absolute value of the input signal again to provide the desired cube of the input signal.

11 Claims, 3 Drawing Figures

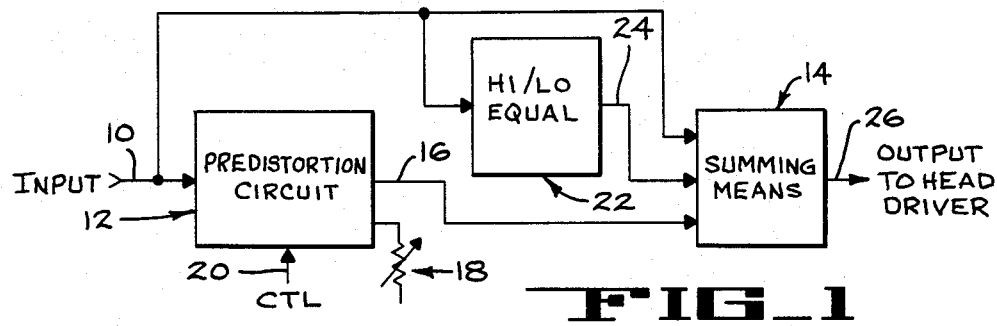
FIG_1
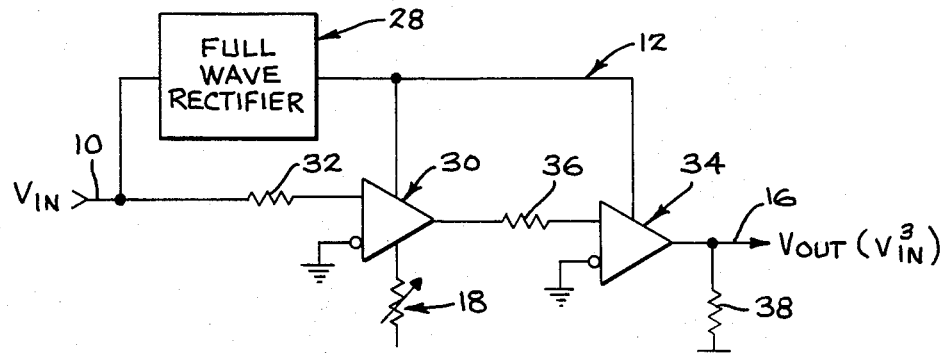
FIG_2
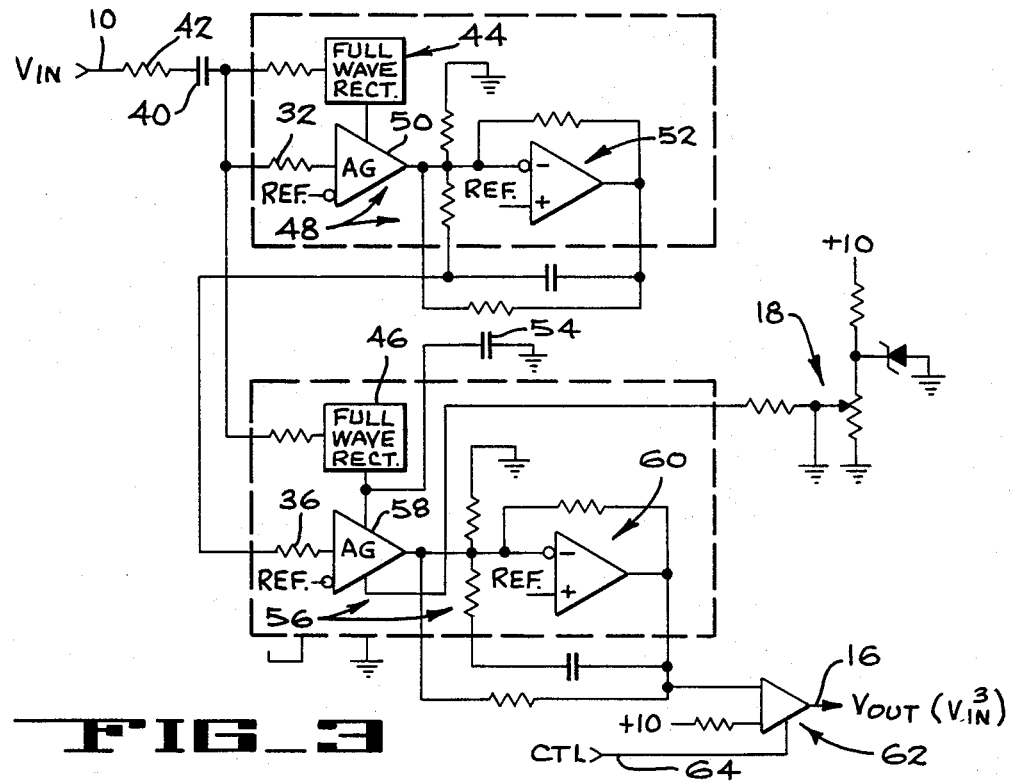
FIG_3

PREDISTORTION CIRCUIT

BACKGROUND AND SUMMARY OF THE INVENTION

The invention relates to predistortion in audio circuits, and particularly to a circuit for optimizing third harmonic distortion in an analog recording by over-recording signal peaks to compensate for tape saturation effects.

As commonly known in the analog recording field, magnetic recordings are adversely affected by harmonic and inter-modulation distortion, especially at a high recording level wherein tape saturation effects are of major concern. Equally well known are non-linear circuit techniques for properly predistorting the recording signal to reduce the harmonic distortion.

One such technique for properly predistorting the recording signal, is to calculate several points on a $X^3$ curve, i.e., several different amplitudes weighted towards the levels of saturation on the tape where predistortion particularly is needed. Then an amplifier circuit is designed to provide diode break points such that the gain is increased at the output of the amplifier when the recording signal reaches a selected point, increases again when it reaches a second selected point, etc. This provides accordingly a piece-wise linear approximation of the curve $X^3$. Such a technique is relatively inexpensive, requiring only one-percent resistors to insure that the break points are properly located. However, such technique is also very temperature sensitive, since there are numerous diodes strung together and the gains can vary due to variations in the selected break point values, caused in turn by temperature changes.

A more sophisticated technique for providing proper predistortion of a recording signal is through the use of four-quadrant multipliers. The multipliers are disposed in series, wherein the first multiplier provides the square of the input signal, while the second multiplier provides for multiplication of the first multiplier output with the input signal. The result is a predistortion error signal corresponding to the cube of the input signal; i.e., an output signal corresponding to the third harmonic distortion.

However, each four-quadrant multiplier has two offsets which need be adjusted, wherein all four adjustments are interdependent. Thus, what theoretically appears to be a relatively straight-forward adjustment is, in practice, relatively difficult due to the interdependence of the multiple offset adjustments.

In addition, four-quadrant multipliers inherently tend to be very noisy devices. Thus, the devices tend to add noise to the predistortion signal which may further deteriorate the signal-to-noise ratio of the recording signal. As a result although the signal-to-noise is not tape limited, it is instead limited by the predistortion circuit.

A further disadvantage of the four-quadrant multiplier predistortion circuit is that such devices are relatively expensive.

The invention overcomes the shortcomings of the typical predistortion circuits of previous mention, by providing a relatively inexpensive predistortion circuit which has only one offset adjustment and which generates a truly linear predistortion signal. Further, the circuit is relatively independent of temperature variations.

To this end, the input signal to the predistorted circuit is fed to a full wave rectifier as well as to an operational transconductance amplifier. The latter amplifier has a gain stage whose gain is set by a control current. The amplifier output is fed to a second operational transconductance amplifier, which thence supplies the output predistortion signal corresponding to the third harmonic distortion. The output of the full wave rectifier comprises the absolute value of the input signal and is supplied to the gain control input of each of the two amplifiers. Thus the output of the first amplifier is the abosolute value of the input signal multiplied by the input signal and its sign, i.e., is the square of the input signal times the sign of the input signal. The output of the second amplifier comprises the square of the input signal multiplied again by the absolute value of the input signal, which corresponds to the input signal cubed. The cubed output signal from the second amplifier then is added to the initial input signal as an error term, to provide the predistortion recording signal to the head. A single offset adjustment is provided at one of the amplifiers.

Accordingly, it is an object of the invention to improve the third harmonic distortion in analog recordings by over recording signal peaks to compensate for tape saturation.

Another object is to provide a predistortion error signal with truly linear functionality and a minimum of adjustments.

A further object is to provide for predistortion signal generation via an inexpensive circuit which further is relatively temperature independent.

A yet further object is to generate a predistortion signal via first squaring and then cubing the input signal.

BRIEF DESCRIPTION OF THE DRAWINGS

FIG. 1 is a block diagram of the invention predistortion circuit as utilized in an analog recording system.

FIG. 2 is a schematic diagram of the invention predistortion circuit.

FIG. 3 is a schematic diagram of the circuit of FIG. 2 in greater detail.

DESCRIPTION OF THE PREFERRED EMBODIMENTS

Referring to FIG. 1, an input signal corresponding to a processed analog signal, is supplied via an input 10 to a predistortion circuit 12, and also to a summing means 14. The predistortion circuit 12 provides a predistortion error output corresponding to the cube of the input signal, via a line 16. Adjustment of internal imbalance of the predistortion circuit is provided via offset adjustment means 18, while external control of circuit 12 is provided via a control line 20 from a system microprocessor (not shown). The predistortion output on line 16 then is attenuated and the input signal is equalized by high and low frequency equalizer circuits 22 as is well known in the art. The resulting signals on lines 16 and 24 are combined with the input signal on input 10, via the summing means 14 to provide a head driving signal to the head driver circuitry (not shown), via a line 26.

The predistortion circuit 12 is shown in further detail in FIG. 2, wherein like components are similarly numbered. The input signal is supplied on input 10 to full wave rectifier means 28 as well as to the non-inverting input of a first two-quadrant multiplier, i.e., an operational transconductance amplifier 30, via an input resistor 32. The inverting input of amplifier 30 is coupled to a selected reference level, herein depicted as ground, while an offset adjustment to correct for second harmonics is provided via the offset adjustment means 18 of previous mention. The output of amplifier 30 is coupled, via a resistor 36, to the non-inverting input of a second two-quadrant multiplier formed of an operational transconductance amplifier 34. The inverting input of amplifier 34 also is grounded.

The output of the full wave rectifier means 28 is applied to the respective gain control inputs of the amplifiers 30, 34, and provides current control of the gains of the two amplifier gain stages therein. The output of the predistortion circuit is provided as a predistortion error signal on output 16. A load resistor 38 is provided from the output 16 to ground.

FIG. 3 depicts further details of the predistortion circuit of FIGS. 1 and 2. The circuit as shown utilizes a generally available integrated circuit chip known as a compandor NE 570, manufactured by Signetic Corporation. The input signal at input 10 is received from the audio processing circuitry of the recorder system, i.e., the graphic equalizer, noise reduction, etc., circuits. The signal is fed to a capacitor 40 and a resistor 42, and thence to one side of first and second full wave rectifiers 44, 46 as well as to a first two-quadrant multiplier 48. Although the predistortion circuit herein is shown as feeding two full wave rectifiers, one full wave rectifier such as depicted in FIG. 2, may be utilized. Likewise, the full wave rectifiers and/or the operational transconductance amplifiers, may comprise individual integrated circuit chips configured in the schematic depicted in FIG. 3.

The two-quadrant multiplier 48 is formed of an automatic gain stage 50, whose gain is current controlled via the output from the full wave rectifier 44. Thus the input signal is supplied from the gain stage 50 to the inverting input of an operational amplifier circuit 52. The various resistors and capacitors coupled about the operational amplifier 52 provide values which set the DC quiescent operating points, as well as the internal gain, of the operational amplifier 52. The non-inverting input of amplifier 52 is coupled to a selected reference e.g., about 1.8 volts. The amplifier 52 provides a bipolar output signal, which is the input signal $V_{IN}$ of either sign multiplied by the absolute value of $V_{IN}$ applied to the gain stage 50 by the full wave rectifier 44.

The output of the operational amplifier 52 comprises thus the square of the input signal $V_{IN}$ times the sign of the input signal and is applied via the input resistor 36 to a second two-quadrant multiplier 56. The latter also is formed to an automatic gain stage 58 and an operational amplifier circuit 60 similar to stage 50 and circuit 52 of the multiplier 48. The gain stage 58 is current controlled via the absolute value of $V_{IN}$ supplied by the second full wave rectifier 46. As previously mentioned, a single full wave rectifier may be used to provide the current control to both the gain stages 50, 58.

A capacitor 54 is coupled from ground to the output of the full wave rectifier 46 and prevents the internal transistors from going to ground, to thereby speed up the switching characteristics thereof. In addition, the offset adjustment means 18 is herein depicted coupled to the second two-quadrant multiplier, rather than the first as depicted in the FIG. 2. Either configuration, or both offset adjustment means, may be used.

The second two-quadrant multiplier 56 multiplies the squared output of given sign from the two-quadrant multiplier 48 times the absolute value from the full wave rectifier 46, to provide therefrom the cube of the input signal. The latter corresponds to the third harmonic distortion of the input signal, and is provided on output 16 as the predistortion error signal. As depicted in FIG. 1, the predistortion error signal is added to the processed input signal to provide the predistorted recording signal to the head driver circuitry, which over-records signal peaks to compensate for tape saturation effects.

Since different tapes require different values of predistortion due to their individual characteristics viz., formulation, coercivity, thickness, etc., an amplifier stage 62 is provided at the two-quadrant multiplier 56 output. The latter is controlled via a DC voltage on a control line 64, which is supplied in turn via the recorder system microprocessor (not shown) which detects the third harmonic off tape and adjusts the DC voltage accordingly.

What is claimed is:

1. A circuit for generating a predistortion signal from an input signal of given sign, comprising:
   rectifier means for generating the absolute value of the input signal;
   first operational transconductance amplifier means receiving the input signal of given sign and responsive to the absolute value for generating the square of the input signal times the sign of the input signal; and
   second operational transconductance amplifer means coupled to the first operational transconductance amplifier means and responsive a second time to the absolute value for generating the cube of the input signal corresponding to the predistortion signal.

2. The circuit of claim 1 wherein:
   said rectifier means include a full wave rectifier coupled to the input signal; and
   said first and second operational transconductance amplifier means include gain control stages responsive to the full wave rectifier.

3. The circuit of claim 2 wherein the first and second operational transconductance amplifier means further include:
   first and second operational amplifiers respectively, each coupled to respective gain control stages.

4. The circuit of claim 3 wherein:
   said first operational amplifier includes an inverting input coupled to the respective gain control stage; and
   said second operational amplifier includes an inverting input coupled to the gain control stage of the second operational transconductance amplifier means.

5. The circuit of claim 3 including:
   offset adjustment means coupled to either of said gain control stages of said first and second operational transconductance amplifier means for nulling error signals due to internal circuit imbalance.

6. The circuit of claim 3 wherein said rectifier means further include:
   a second full wave rectifier coupled to the input signal; and
   said gain control stages are coupled to a respective one of the first and second full wave rectifiers.

7. The circuit of claim 3 including:

an amplifier stage coupled to the second operational transconductance amplifier means for varying the predistortion signal in response to predetermined predistortion conditions.

8. A circuit for generating a third harmonic signal of an input signal of given sign, comprising:
first means including a full wave rectifier for generating the absolute value of the input signal;
second means including two-quadrant multiplier means coupled to the input signal and responsive to the first means for supplying the square of the input signal times the sign of the input signal; and
third means including two-quadrant multiplier means coupled to the second means and also responsive to the first means for supplying the cube of the input signal.

9. The circuit of claim 8 wherein the two-quadrant multiplier means include:

a current controlled gain stage responsive to the full wave rectifier; and
operational amplifier means coupled to a respective current controlled gain stage.

10. The circuit of claim 8 wherein the two-quadrant multiplier means include:
a first current controlled gain stage coupled to receive the input signal;
a first operational amplifier coupled to the first gain stage;
a second current controlled gain stage coupled to the first operational amplifier; and
a second operational amplifier coupled to the second gain stage.

11. The circuit of claim 10 wherein:
the first and second current controlled gain stages vary the signal thereto in response to the full wave rectifier.

* * * * *